(12) United States Patent
Goertz et al.

(10) Patent No.: US 10,460,296 B2
(45) Date of Patent: Oct. 29, 2019

(54) SYSTEM FOR PROCESSING DATA USING PARAMETERS ASSOCIATED WITH THE DATA FOR AUTO-PROCESSING

(71) Applicant: Bank of America Corporation, Charlotte, NC (US)

(72) Inventors: Jeffrey R. Goertz, Liberty, MO (US); Kerry M. Cantley, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 374 days.

(21) Appl. No.: 15/017,937

(22) Filed: Feb. 8, 2016

(65) Prior Publication Data

US 2017/0228703 A1    Aug. 10, 2017

(51) Int. Cl.

| G06Q 20/42 | (2012.01) |
|---|---|
| G06Q 20/10 | (2012.01) |
| G06Q 40/00 | (2012.01) |
| G06Q 40/02 | (2012.01) |
| G06Q 20/04 | (2012.01) |

(52) U.S. Cl.
CPC ................. G06Q 20/042 (2013.01)

(58) Field of Classification Search
CPC ........ G06Q 20/42; G06Q 20/10; G06Q 40/00; G06Q 40/02
USPC ......................................................... 705/45
See application file for complete search history.

(56) References Cited

U.S. PATENT DOCUMENTS

| 3,555,349 A | 1/1971 | Munz |
|---|---|---|
| 3,555,988 A | 1/1971 | Wagner |
| 3,556,050 A | 1/1971 | Trachtenberg et al. |
| 3,558,810 A | 1/1971 | Cecchin |
| 3,560,739 A | 2/1971 | Wolff |
| 3,561,432 A | 2/1971 | Yamaki et al. |
| 3,564,133 A | 2/1971 | Hobrough |
| 3,564,266 A | 2/1971 | Klotz, Jr. |

(Continued)

FOREIGN PATENT DOCUMENTS

| CN | 1492338 A | 4/2004 |
|---|---|---|
| CN | 1885341 A | 12/2006 |

(Continued)

OTHER PUBLICATIONS

Canadian Office Action dated Oct. 30, 2012 for Application No. 2,546,849.

(Continued)

*Primary Examiner* — Hai Tran
(74) *Attorney, Agent, or Firm* — Michael A. Springs; Moore & Van Allen PLLC; Peter B. Stewart (57) ABSTRACT

Systems, computer program products, and methods are described herein for processing a set of information associated with a check image using one or more disposition parameters to determine an automated disposition of the check associated with the check image. The present invention is configured to receive a set of information associated with a check image; receive one or more disposition parameters associated with a financial institution; apply the one or more disposition parameters to the set of information associated with the check image; determine automated disposition of the check based on at least applying the one or more disposition parameters to the set of information associated with the check image; and execute the automated disposition of the check.

15 Claims, 2 Drawing Sheets

(56) References Cited

U.S. PATENT DOCUMENTS

| | | | |
|---|---|---|---|
| 3,566,139 | A | 2/1971 | Hardy et al. |
| 3,567,856 | A | 3/1971 | Nezu |
| 3,571,527 | A | 3/1971 | Becker et al. |
| 3,572,924 | A | 3/1971 | Matsumoto et al. |
| 3,576,392 | A | 4/1971 | Hofstein |
| 3,576,999 | A | 5/1971 | Blythe et al. |
| 3,578,857 | A | 5/1971 | Busch |
| 3,584,148 | A | 6/1971 | Flory |
| 3,584,931 | A | 6/1971 | Doring |
| 3,585,283 | A | 6/1971 | Graser, Jr. |
| 3,586,765 | A | 6/1971 | Jirka |
| 3,592,535 | A | 7/1971 | Gerry |
| 3,592,548 | A | 7/1971 | Majkowski |
| 3,614,309 | A | 10/1971 | Presti |
| 3,614,764 | A | 10/1971 | Kolb et al. |
| 3,615,540 | A | 10/1971 | Land et al. |
| 3,619,052 | A | 11/1971 | Diachuk et al. |
| 3,619,060 | A | 11/1971 | Johnson |
| 3,620,729 | A | 11/1971 | Somerset et al. |
| 3,622,224 | A | 11/1971 | Wysocki et al. |
| 3,627,918 | A | 12/1971 | Redpath |
| 3,630,623 | A | 12/1971 | Schirmer |
| 3,632,181 | A | 1/1972 | Lee |
| 3,635,139 | A | 1/1972 | Guite, Sr. |
| 3,636,845 | A | 1/1972 | Harvey |
| 3,643,017 | A | 2/1972 | Pekau |
| 3,643,019 | A | 2/1972 | Beltz |
| 3,646,256 | A | 2/1972 | Jacob et al. |
| 3,647,289 | A | 3/1972 | Weber |
| 3,647,290 | A | 3/1972 | Egnaczak et al. |
| 3,647,441 | A | 3/1972 | Bachelder |
| 3,648,388 | A | 3/1972 | Lowell et al. |
| 3,648,584 | A | 3/1972 | Eacock |
| 3,652,164 | A | 3/1972 | Faramarzpour et al. |
| 3,654,707 | A | 4/1972 | Roberts |
| 3,656,427 | A | 4/1972 | Foley |
| 3,659,159 | A | 4/1972 | Nagata |
| 3,661,457 | A | 5/1972 | Frech |
| 3,661,577 | A | 5/1972 | Klemm et al. |
| 3,737,628 | A | 6/1973 | Azure, Jr. |
| 3,778,595 | A | 12/1973 | Hatanaka et al. |
| 4,417,136 | A | 11/1983 | Rushby et al. |
| 4,523,330 | A | 6/1985 | Cain |
| 4,555,617 | A | 11/1985 | Brooks et al. |
| 5,007,100 | A | 4/1991 | D'Aoust et al. |
| 5,182,656 | A | 1/1993 | Chevion et al. |
| 5,257,328 | A | 10/1993 | Shimizu |
| 5,359,667 | A | 10/1994 | Borowski et al. |
| 5,453,601 | A | 9/1995 | Rosen |
| 5,600,574 | A | 2/1997 | Reitan |
| 5,631,984 | A | 5/1997 | Graf et al. |
| 5,678,046 | A | 10/1997 | Cahill et al. |
| 5,679,940 | A | 10/1997 | Templeton et al. |
| 5,687,250 | A | 11/1997 | Curley et al. |
| 5,740,271 | A | 4/1998 | Kunkler et al. |
| 5,754,673 | A | 5/1998 | Brooks et al. |
| 5,774,249 | A | 6/1998 | Shiraishi et al. |
| 5,848,400 | A | 12/1998 | Chang |
| 5,917,965 | A | 6/1999 | Cahill et al. |
| 5,940,844 | A | 8/1999 | Cahill et al. |
| 5,963,659 | A | 10/1999 | Cahill et al. |
| 6,076,074 | A | 6/2000 | Cotton et al. |
| 6,097,834 | A | 8/2000 | Krouse et al. |
| 6,115,509 | A | 9/2000 | Yeskel |
| 6,122,625 | A | 9/2000 | Rosen |
| 6,181,814 | B1 | 1/2001 | Carney |
| 6,181,837 | B1 | 1/2001 | Cahill et al. |
| 6,351,553 | B1 | 2/2002 | Hayosh |
| 6,574,377 | B1 | 6/2003 | Cahill et al. |
| 6,658,393 | B1 | 12/2003 | Basch et al. |
| 6,671,795 | B1 | 12/2003 | Marr et al. |
| 6,697,512 | B2 | 2/2004 | Simonoff |
| 6,775,422 | B1 | 8/2004 | Altman |
| 6,845,366 | B1 | 1/2005 | Hassanein et al. |
| 6,886,136 | B1 | 4/2005 | Zlotnick et al. |
| 6,903,767 | B2 | 6/2005 | Robins et al. |
| 6,913,260 | B2 | 7/2005 | Maier et al. |
| 7,082,216 | B2 | 7/2006 | Jones et al. |
| 7,092,560 | B2 | 8/2006 | Jones et al. |
| 7,092,561 | B2 | 8/2006 | Downs, Jr. |
| 7,103,438 | B2 | 9/2006 | Hallowell et al. |
| 7,171,032 | B2 | 1/2007 | Jones et al. |
| 7,181,430 | B1 | 2/2007 | Buchanan et al. |
| 7,191,151 | B1 | 3/2007 | Nosek |
| 7,191,657 | B2 | 3/2007 | Maier et al. |
| 7,197,173 | B2 | 3/2007 | Jones et al. |
| 7,201,320 | B2 | 4/2007 | Csulits et al. |
| 7,209,571 | B2 | 4/2007 | Davis et al. |
| 7,216,106 | B1 | 5/2007 | Buchanan et al. |
| 7,232,024 | B2 | 6/2007 | Mazur et al. |
| 7,362,891 | B2 | 4/2008 | Jones et al. |
| 7,366,338 | B2 | 4/2008 | Jones et al. |
| 7,376,603 | B1 | 5/2008 | Mayr et al. |
| 7,386,511 | B2 | 6/2008 | Buchanan et al. |
| 7,391,897 | B2 | 6/2008 | Jones et al. |
| 7,436,979 | B2 | 10/2008 | Bruce et al. |
| 7,440,924 | B2 | 10/2008 | Buchanan et al. |
| 7,503,445 | B2 | 3/2009 | Yoshioka |
| 7,505,831 | B2 | 3/2009 | Jones et al. |
| 7,505,931 | B2 | 3/2009 | Da Silva |
| 7,516,360 | B2 | 4/2009 | Bacher et al. |
| 7,542,598 | B2 | 6/2009 | Jones et al. |
| 7,590,274 | B2 | 9/2009 | Raterman et al. |
| 7,591,428 | B2 | 9/2009 | Freeman et al. |
| 7,599,543 | B2 | 10/2009 | Jones et al. |
| 7,602,956 | B2 | 10/2009 | Jones et al. |
| 7,619,721 | B2 | 11/2009 | Jones et al. |
| 7,620,231 | B2 | 11/2009 | Jones et al. |
| 7,624,071 | B2 | 11/2009 | Buchanan et al. |
| 7,628,326 | B2 | 12/2009 | Freeman et al. |
| 7,635,082 | B2 | 12/2009 | Jones |
| 7,686,151 | B2 | 3/2010 | Renz et al. |
| 7,702,588 | B2 | 4/2010 | Gilder et al. |
| 7,729,990 | B2 | 6/2010 | Marceau et al. |
| 7,735,621 | B2 | 6/2010 | Hallowell et al. |
| 7,762,380 | B2 | 7/2010 | Freeman et al. |
| 7,778,456 | B2 | 8/2010 | Jones et al. |
| 7,779,982 | B2 | 8/2010 | Fitzgerald et al. |
| 7,789,243 | B2 | 9/2010 | Hornung et al. |
| 7,792,753 | B1 | 9/2010 | Slater et al. |
| 7,797,239 | B2 | 9/2010 | Smith |
| 7,802,721 | B2 | 9/2010 | Wilson, Jr. et al. |
| 7,817,842 | B2 | 10/2010 | Mennie |
| 7,822,629 | B2 | 10/2010 | Chen et al. |
| 7,849,994 | B2 | 12/2010 | Klein et al. |
| 7,873,200 | B1 | 1/2011 | Oakes, III et al. |
| 7,873,576 | B2 | 1/2011 | Jones et al. |
| 7,881,519 | B2 | 2/2011 | Jones et al. |
| 7,882,000 | B2 | 2/2011 | Jones |
| 7,885,451 | B1 | 2/2011 | Walls et al. |
| 7,885,880 | B1 | 2/2011 | Prasad et al. |
| 7,903,863 | B2 | 3/2011 | Jones et al. |
| 7,929,749 | B1 | 4/2011 | Jones et al. |
| 7,938,245 | B2 | 5/2011 | Jenrick et al. |
| 7,946,406 | B2 | 5/2011 | Blake et al. |
| 7,950,656 | B2 | 5/2011 | Adams |
| 7,962,411 | B1 | 6/2011 | Prasad et al. |
| 7,970,677 | B1 | 6/2011 | Oakes, III et al. |
| 7,978,899 | B2 | 7/2011 | Jenrick et al. |
| 8,025,213 | B2 | 9/2011 | Hartfield et al. |
| 8,027,928 | B1 | 9/2011 | Hecht, Jr. et al. |
| 8,041,098 | B2 | 10/2011 | Jones et al. |
| 8,045,784 | B2 | 10/2011 | Price et al. |
| 8,060,442 | B1 | 11/2011 | Hecht et al. |
| 8,073,751 | B2 | 12/2011 | Garg et al. |
| 8,082,207 | B2 | 12/2011 | Bates et al. |
| 8,103,084 | B2 | 1/2012 | Jones et al. |
| 8,125,624 | B2 | 2/2012 | Jones et al. |
| 8,126,793 | B2 | 2/2012 | Jones |
| 8,162,125 | B1 | 4/2012 | Csulits et al. |
| 8,169,602 | B2 | 5/2012 | Jones et al. |
| 8,204,293 | B2 | 6/2012 | Csulits et al. |

(56) References Cited

U.S. PATENT DOCUMENTS

| | | |
|---|---|---|
| 8,214,373 B1 | 7/2012 | Bakir et al. |
| 8,214,686 B2 | 7/2012 | Ueda |
| 8,265,346 B2 | 9/2012 | Blair |
| 8,290,216 B1 | 10/2012 | Blair |
| 8,297,428 B2 | 10/2012 | Renz et al. |
| 8,301,565 B2 | 10/2012 | Cantley et al. |
| 8,322,505 B2 | 12/2012 | Freeman et al. |
| 8,331,643 B2 | 12/2012 | Yacoubian et al. |
| 8,339,589 B2 | 12/2012 | Jones et al. |
| 8,412,605 B2 | 4/2013 | Griffin et al. |
| 8,474,704 B1 | 7/2013 | Grimm et al. |
| 8,504,456 B2 | 8/2013 | Griffin et al. |
| 8,526,751 B2 | 9/2013 | Mitchell et al. |
| 8,527,412 B1 | 9/2013 | Waldron, III et al. |
| 8,600,879 B2 | 12/2013 | Reyes |
| 8,610,966 B2 | 12/2013 | Hatzav et al. |
| 8,639,062 B2 | 1/2014 | Calman et al. |
| 8,714,336 B2 | 5/2014 | Csulits et al. |
| 8,718,367 B1 | 5/2014 | Schneider et al. |
| 8,738,529 B2 | 5/2014 | Kolhatkar et al. |
| 8,799,161 B2 | 8/2014 | Kreutz et al. |
| 8,824,785 B2 | 9/2014 | Ives et al. |
| 8,864,029 B2 | 10/2014 | McGlamery et al. |
| 9,025,851 B2 | 5/2015 | Smith et al. |
| 9,082,007 B2 | 7/2015 | Smith et al. |
| 2001/0034682 A1 | 10/2001 | Knight et al. |
| 2001/0037297 A1 | 11/2001 | McNair |
| 2001/0051921 A1 | 12/2001 | Garner, IV et al. |
| 2002/0038289 A1 | 3/2002 | Lawlor et al. |
| 2002/0072942 A1 | 6/2002 | Kuykendall et al. |
| 2002/0082994 A1 | 6/2002 | Herziger |
| 2002/0087409 A1 | 7/2002 | Joao |
| 2002/0128969 A1 | 9/2002 | Parmelee et al. |
| 2003/0059098 A1 | 3/2003 | Jones et al. |
| 2003/0066876 A1 | 4/2003 | Goldman et al. |
| 2003/0120586 A1 | 6/2003 | Litty |
| 2003/0126444 A1 | 7/2003 | Wakao et al. |
| 2003/0128375 A1 | 7/2003 | Ruhl et al. |
| 2003/0138128 A1 | 7/2003 | Rhoads |
| 2003/0217005 A1 | 11/2003 | Drummond et al. |
| 2004/0133516 A1 | 7/2004 | Buchanan et al. |
| 2004/0153650 A1 | 8/2004 | Hillmer |
| 2004/0153663 A1 | 8/2004 | Clark et al. |
| 2004/0218729 A1 | 11/2004 | Xue et al. |
| 2004/0245330 A1 | 12/2004 | Swift et al. |
| 2005/0034054 A1 | 2/2005 | Tsuyama et al. |
| 2005/0038756 A1 | 2/2005 | Nagel |
| 2005/0049950 A1 | 3/2005 | Johnson |
| 2005/0071283 A1* | 3/2005 | Randle ............... G06Q 20/04 705/75 |
| 2005/0080701 A1 | 4/2005 | Tunney et al. |
| 2005/0097019 A1 | 5/2005 | Jacobs |
| 2005/0125296 A1 | 6/2005 | Tidwell et al. |
| 2005/0139670 A1 | 6/2005 | McGlamery et al. |
| 2005/0160227 A1 | 7/2005 | Todd et al. |
| 2005/0213805 A1 | 9/2005 | Blake et al. |
| 2005/0220324 A1 | 10/2005 | Klein et al. |
| 2005/0244035 A1 | 11/2005 | Klein et al. |
| 2005/0283609 A1 | 12/2005 | Langford |
| 2006/0028689 A1 | 2/2006 | Perry et al. |
| 2006/0059201 A1 | 3/2006 | Watanabe |
| 2006/0080245 A1 | 4/2006 | Bahl et al. |
| 2006/0089905 A1 | 4/2006 | Song et al. |
| 2006/0106717 A1 | 5/2006 | Randle et al. |
| 2006/0116898 A1 | 6/2006 | Peterson |
| 2006/0117182 A1 | 6/2006 | Wolff |
| 2006/0156382 A1 | 7/2006 | Motoyama |
| 2006/0182331 A1 | 8/2006 | Gilson et al. |
| 2006/0212391 A1 | 9/2006 | Norman et al. |
| 2006/0212502 A1 | 9/2006 | Chatterjee |
| 2006/0247992 A1 | 11/2006 | Song et al. |
| 2006/0248009 A1 | 11/2006 | Hicks et al. |
| 2006/0282660 A1 | 12/2006 | Varghese et al. |
| 2007/0043650 A1 | 2/2007 | Hughes et al. |
| 2007/0045395 A1 | 3/2007 | Corona et al. |
| 2007/0100750 A1 | 5/2007 | Hartfield et al. |
| 2007/0124241 A1 | 5/2007 | Newton |
| 2007/0150412 A1 | 6/2007 | Lamparello et al. |
| 2007/0174214 A1 | 7/2007 | Welsh et al. |
| 2007/0234102 A1 | 10/2007 | Fan et al. |
| 2007/0288382 A1 | 12/2007 | Narayanan et al. |
| 2008/0016358 A1 | 1/2008 | Filreis et al. |
| 2008/0040249 A1 | 2/2008 | Re et al. |
| 2008/0059962 A1 | 3/2008 | Ito |
| 2008/0077474 A1 | 3/2008 | Dumas et al. |
| 2008/0086420 A1 | 4/2008 | Gilder et al. |
| 2008/0086421 A1 | 4/2008 | Gilder et al. |
| 2008/0103800 A1 | 5/2008 | Domenikos et al. |
| 2008/0103972 A1 | 5/2008 | Lanc |
| 2008/0116257 A1 | 5/2008 | Fickling |
| 2008/0140576 A1 | 6/2008 | Lewis et al. |
| 2008/0249931 A1 | 10/2008 | Gilder et al. |
| 2008/0256167 A1 | 10/2008 | Branson et al. |
| 2008/0270206 A1 | 10/2008 | Gillum |
| 2008/0294514 A1 | 11/2008 | Calman |
| 2008/0294541 A1 | 11/2008 | Weinflash et al. |
| 2008/0307258 A1 | 12/2008 | Challenger et al. |
| 2008/0319922 A1 | 12/2008 | Lawrence et al. |
| 2009/0008442 A1 | 1/2009 | Buchanan et al. |
| 2009/0018958 A1 | 1/2009 | Aveyard et al. |
| 2009/0094148 A1 | 4/2009 | Gilder et al. |
| 2009/0106846 A1 | 4/2009 | Dupray et al. |
| 2009/0141962 A1 | 6/2009 | Borgia et al. |
| 2009/0150288 A1 | 6/2009 | Bishop et al. |
| 2009/0196485 A1 | 8/2009 | Mueller et al. |
| 2009/0248560 A1 | 10/2009 | Recce et al. |
| 2009/0248573 A1 | 10/2009 | Haggerty et al. |
| 2009/0309694 A1 | 12/2009 | Nichols et al. |
| 2010/0030644 A1 | 2/2010 | Dhamodharan |
| 2010/0070415 A1 | 3/2010 | Buchanan et al. |
| 2010/0122216 A1 | 5/2010 | Song et al. |
| 2010/0161466 A1 | 6/2010 | Gilder |
| 2010/0217612 A1 | 8/2010 | Apacible et al. |
| 2010/0299553 A1 | 11/2010 | Cen |
| 2010/0306111 A1 | 12/2010 | Slater et al. |
| 2011/0066547 A1 | 3/2011 | Clark et al. |
| 2011/0099067 A1 | 4/2011 | Cooper et al. |
| 2011/0161346 A1 | 6/2011 | Solihin |
| 2011/0215034 A1 | 9/2011 | Mennie et al. |
| 2011/0276483 A1* | 11/2011 | Saegert ............... G06Q 20/042 705/43 |
| 2012/0030678 A1 | 2/2012 | Hayduchok et al. |
| 2012/0117423 A1 | 5/2012 | Andrade et al. |
| 2012/0189186 A1 | 7/2012 | Csulits et al. |
| 2013/0024360 A1 | 1/2013 | Ballout |
| 2013/0097464 A1 | 4/2013 | Ahmad et al. |
| 2013/0325698 A1 | 12/2013 | Shao et al. |
| 2013/0339204 A1 | 12/2013 | Dias De Assunca et al. |
| 2014/0058914 A1 | 2/2014 | Song et al. |
| 2014/0188804 A1 | 7/2014 | Gokhale et al. |
| 2014/0233831 A1 | 8/2014 | Palmer et al. |
| 2014/0233836 A1* | 8/2014 | Smith ............... G06Q 20/0425 382/137 |
| 2014/0236791 A1 | 8/2014 | Palmer et al. |
| 2014/0250336 A1 | 9/2014 | Tepus |
| 2014/0281704 A1 | 9/2014 | Jacobson et al. |
| 2014/0330789 A1 | 11/2014 | Copes et al. |
| 2014/0358863 A1 | 12/2014 | Bennett et al. |
| 2015/0195190 A1 | 7/2015 | Shah Heydari |
| 2016/0034362 A1 | 2/2016 | Al-Wahabi |
| 2017/0109837 A1 | 4/2017 | Loganathan et al. |
| 2017/0168959 A1 | 6/2017 | Dodonov et al. |

FOREIGN PATENT DOCUMENTS

| | | |
|---|---|---|
| CN | 101059863 A | 10/2007 |
| EP | 115189 A1 | 10/1987 |
| EP | 671696 A1 | 9/1995 |
| EP | 1507243 A2 | 2/2005 |
| JP | 2006155439 A | 6/2006 |
| WO | 03040881 A2 | 5/2003 |

(56) References Cited

FOREIGN PATENT DOCUMENTS

| WO | 2004036386 A2 | 4/2004 |
|---|---|---|
| WO | 2005006269 A1 | 1/2005 |

OTHER PUBLICATIONS

Chen, Ming-ju et al. "A Digital Watermarking of Detecting the Image Integrity Based on DWT." Information and Electronic Engineering. vol. 6, No. 2, Apr. 2008. Chinese Language. 4 pages.
Han, Shui-Hua et al. "Content-based image authentication: current status, issues, and challenges." Int. J. Inf. Secur. (2010) 9:19-32. DOI 10.1007/s10207-009-0093-2. Regular Contribution. Published Online Oct. 8, 2009. 0 Springer-Verlag 2009.
International Preliminary Report of Patentability and Written Opinion dated Jun. 5, 2012 for International Application No. PCT/US2010/058380.
International Preliminary Report of Patentability and Written Opinion dated Jun. 5, 2012 for International Application No. PCT/US2010/058403.
International Preliminary Report of Patentability and Written Opinion dated Jun. 5, 2012 for International Application No. PCT/US2010/058409.
International Preliminary Report of Patentability and Written Opinion dated Jun. 5, 2012 for International Application No. PCT/US2010/058414.
International Preliminary Report on Patentability dated Apr. 22, 2010 for International Application No. PCT/US2008/085873.
International Preliminary Report on Patentability dated Jul. 3, 2006 for International Application No. PCT/US2004/043832.
International Search Report and Written Opinion dated Jan. 24, 2011 for International Application No. PCT/US2010/058403.
International Search Report and Written Opinion dated Jan. 24, 2011 for International Application No. PCT/US2010/058414.
International Search Report and Written Opinion dated Jan. 31, 2011 for International Application No. PCT/US2010/058409.
International Search Report and Written Opinion dated Jan. 24, 2011 for International Application No. PCT/US2010/058380.
International Search Report dated Apr. 23, 2008 for International Application No. PCT/US2007/083198.
International Search Report and Written Opinion dated May 19, 2005 for International Application No. PCT/US2004/043832.
Kwak et al., "Benefits, obstacles, and future of six sigma approach", Technovation, vol. 26, pp. 708-715, 2006.
Labys, W. P. (2001). Essays on microstructure and the use of information in limit order markets. (Order No. 3003649, University of Pennsylvania). ProQuest Dissertations and Theses, 195-195 p. Retrieved from http://search.proquest.com/docview/251101049?accountid=14753. (251101049).
Mitchell, Joseph Pershing, I., 11. (2000) The central bankers: Administrative legitimacy and the federal reserve system. (Order No. 3065450, Virginia Polytechnic Institute and State University). ProQuest Dissertations and Theses, 269-269 p. Retrieved from http://search.proquest.com/docview/304626254?accountid=14753. (304626254).
Muller, J. D. (1998). Selected development in the law of cyberspace payments. The Business Lawyer, 54(1), 403-441. Retrieved from http://search.proquest.com/docview/228450582?accountid=14753.
Patricia Murphy, It's a Time of Change for Check Processing, May 2004, USBanker, pp. 1-5.
State Intellectual Property Office of the People's Republic of China. Chinese Office Action dated May 11, 2012. Chinese Application No. 200810177822.1. Name of Applicant: Bank of America Corporation. Chinese Language. 34 pages.
"Money Laundering: A Banker's Guide to Avoiding Problems," published on the internet at www.occ.treas.gov/money-laundering/pub-money-laundering-bankers guide, Dec. 2002 (Year 2002).

\* cited by examiner

SYSTEM FOR PROCESSING DATA USING PARAMETERS ASSOCIATED WITH THE DATA FOR AUTO-PROCESSING

BACKGROUND

Financial institutions often receive large quantities of checks related to financial transactions. Typically, these checks are processed electronically by scanning an image of the check. Due to the varied period of time that these checks are stored after the transaction has been processed, organizing, categorizing, and analyzing the checks can be difficult. There is a need for a system to process a set of information associated with a check image using one or more disposition parameters to determine an automated disposition of the check associated with the check image.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for processing a set of information associated with a check image file using one or more disposition parameters to determine an automated disposition of the check associated with the check image file is presented. The system comprising at least one memory; at least one processor; and at least one module stored in the at least one memory and comprising instruction code that is executable by the at least one processor and configured to cause the at least one processor to: receive a set of information associated with a check image file, wherein the set of information associated with the check image file comprises information extracted from a scanned image of a check and metadata associated with the check; receive one or more disposition parameters associated with a financial institution; apply the one or more disposition parameters to the set of information associated with the check image file; and determine automated disposition of the check based on at least applying the one or more disposition parameters to the set of information associated with the check image file; and execute the automated disposition of the check, wherein executing the automated disposition further comprises physical placement of the check in a check repository associated with the financial institution.

In some embodiments, the module is configured to execute computer-readable program code further to: identify one or more issues associated with the check based on at least applying the one or more disposition parameters to the set of information associated with the check image file associated with the check; and determine automated disposition of the check based on at least the one or more identified issues associated with the check.

In some embodiments, the module is configured to execute computer-readable program code further to: determine that the automated disposition of the check comprises determining that the check has been processed successfully and can be disposed permanently.

In some embodiments, the module is configured to execute computer-readable program code further to: determine that the automated disposition of the check comprises placing the check on hold in the check repository for a predetermined period of time based on at least the one or more issues identified.

In some embodiments, the module is configured to execute computer-readable program code further to: determine that the one or more issues comprises an indication that the check is to be returned to a financial institution customer; determine that the automated disposition of the check comprises placing the check on hold to be returned to the customer based on at least the one or more issues identified.

In some embodiments, the module is configured to execute computer-readable program code further to: receive a set of information associated with one or more check image files, wherein the set of information associated with the one or more check image files comprises information extracted from a scanned image of one or more checks and metadata associated with the one or more checks; and initiate a batch processing for the one or more checks, wherein initiating further comprises aggregating the set of information associated with the one or more check image files into one or more batches.

In some embodiments, the module is configured to execute computer-readable program code further to: identify one or more issues associated with a batch of checks based on at least aggregating the set of information associated with the one or more checks; and determine and automated disposition of the batch of checks based on at least the one or more identified issues associated with the one or more checks in the batch.

In some embodiments, the module is configured to execute computer-readable program code further to: receive one or more disposition parameters, wherein the one or more disposition parameters are associated with a method of processing of the check, wherein the method of processing of the check further comprises an automated check processing and a manual check processing.

In another aspect, a computerized method for processing a set of information associated with a check image using one or more disposition parameters to determine an automated disposition of the check associated with the check image is presented. The method comprises receiving a set of information associated with a check image, wherein the set of information associated with the check image comprises information extracted from a scanned image of a check and metadata associated with the check; receiving one or more disposition parameters associated with a financial institution; applying the one or more disposition parameters to the set of information associated with the check image; and determining automated disposition of the check based on at least applying the one or more disposition parameters to the set of information associated with the check image; and executing the automated disposition of the check, wherein executing the automated disposition further comprises physical placement of the check in a check repository associated with the financial institution.

In another aspect, a computer program product for processing a set of information associated with a check image using one or more disposition parameters to determine an automated disposition of the check associated with the check image is presented. The computer program product comprising a computer readable storage medium having computer readable program code embodied therewith, the computer readable program code comprising computer readable code configured to receive a set of information associated with a check image, wherein the set of information associated with the check image comprises information extracted from a scanned image of a check and metadata associated with the check; computer readable code configured to receive one or more disposition parameters associated with a financial institution; computer readable code configured to apply the one or more disposition parameters to the set of information associated with the check image; and computer readable code configured to determine automated disposition of the check based on at least applying the one or more disposition parameters to the set of information associated with the check image; and computer readable code configured to execute the automated disposition of the check, wherein executing the automated disposition further comprises physical placement of the check in a check repository associated with the financial institution

BRIEF DESCRIPTION OF THE DRAWINGS

Having thus described embodiments of the invention in general terms, reference will now be made to the accompanying drawings, where:

DETAILED DESCRIPTION OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

In some embodiments, an "entity" as used herein may be a financial institution. A "facility" may be physical premises associated with the entity. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, etc. The account is associated with and/or maintained by the entity. In other embodiments, an "entity" may not be a financial institution. In other embodiments, an entity may or may not allow the user to establish an account associated with the entity.

In some embodiments, the "user" may be a customer (e.g., an account holder or a person who has an account (e.g., banking account, credit account, etc.) at the entity) or potential customer (e.g., a person who has submitted an application for an account, a person who is the target of marketing materials that are distributed by the entity, a person who applies for a loan that not yet been funded). In some embodiments, an "employee" may be a financial institution employee (e.g., an underwriter, a project manager, an IT specialist, a manager, an administrator, an internal operations analyst, bank teller, or the like).

Figure 1:
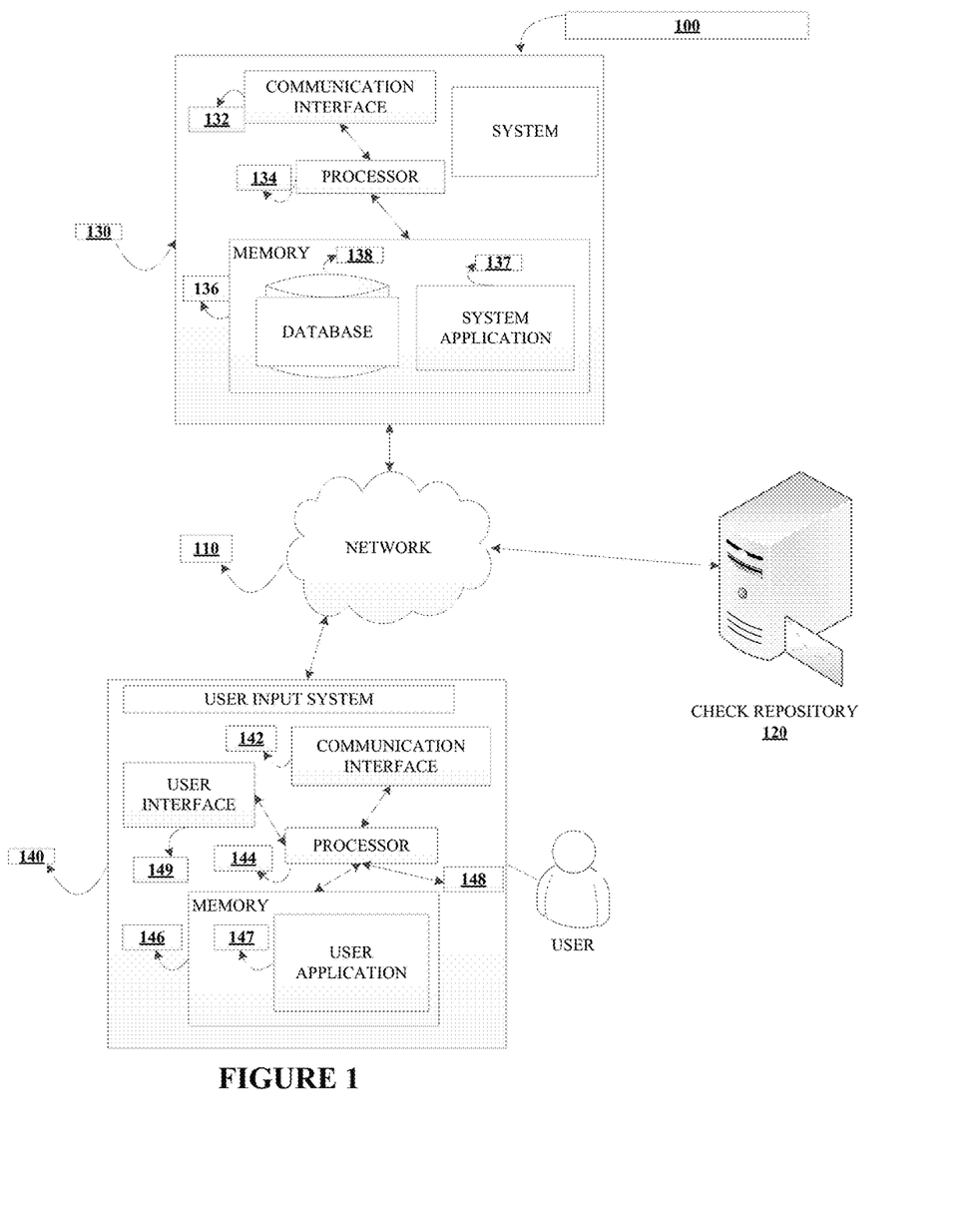
FIG. 1 provides a block diagram illustrating a system environment for processing a set of information associated with a check image using one or more disposition parameters to determine an automated disposition of the check associated with the check image, in accordance with embodiments of the invention.

FIG. 1 presents an exemplary block diagram of the system environment 100 for implementing the process flows described herein in accordance with embodiments of the present invention. As illustrated, the system environment 100 includes a network 110, a check repository 120, a system 130, and a user input system 140. Also shown in FIG. 1 is a user of the user input system 140. The user input system 140 may be a transaction terminal associated with the financial institution or any other source, or a device associated with the source, capable of receiving checks. The user may be a person who uses the user input system 140 to execute a user application 147. The user application 147 may be an application to communicate with the system 130, perform a transaction (e.g. check deposit), input information onto a user interface presented on the user input system 140, or the like. The user application 147 and/or the system application 137 may incorporate one or more parts of any process flow described herein.

As shown in FIG. 1, the check repository 120, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The check repository 120 may refer to a document management system for managing the checks and/or any other financial institution documents from a time they are received for storage to their eventual disposal. This includes identifying, classifying, storing, securing, retrieving, tracking, and destroying or permanently preserving checks. The purpose of the check repository 120 is part of an entity's broader function of governance, risk, and compliance and is primarily concerned with managing the evidence of an entity's activities associated with the check as well as the reduction or mitigation of misappropriation associated with the check. Typically, the system described herein is configured to process the checks received from a user via the user input system 140 and after the processing of the check, transmit control signals via the network 110 to execute actions that enable the physical paper check to be placed within the check repository 120 for either additional processing or secure disposal.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a transaction device, GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, a transaction terminal, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the entity. The system 130 may be located at the facility associated with the entity or remotely from the facility associated with the entity. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein. In some embodiments, the one or more devices performing the steps are associated with a financial institution. In other embodiments, the one or more devices performing the steps are associated with a merchant, business, partner, third party, credit agency, account holder, and/or user.

Typically, when a user deposits a check using the user input system 140, the system may be configured to receive one or more check images. The check images comprise at least a portion of the front of the check, at least a portion of the back of the check, or any other portions of the check. In cases where there are several checks piled into a stack, the multiple check images may include, for example, at least portion of each of the four sides of the check stack. In this way, a text, numbers, or other data provided on the site of the check stack may also be used in processing the checks. All the check images are described in the process flows below, it will be understood that any type of financial record/document image or non-financial record/document image may be included in the process.

In some embodiments, each check image comprises financial record data. The financial record data includes dates of issuance of financial record, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like. In other embodiments, the check images comprise markings. The markings include, for example, text, numbers, symbols, other characters, lines, shadows, shapes, ink blots, stains, logos, paper tears, smudges, watermarks, any visible marking on the paper check, any visible marking applied electronically to the check image, or any pixel/texel quantity thereof.

Although check images are illustrated in process flow below, it will be understood that any type of image (e.g., PDF files, scanned documents, digital photographs with or without letters, numbers, and the like) or financial record may be received in accordance with the embodiments of the invention. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, joint account holder, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system.

The check image may then be processed using optical character recognition (OCR) processes that enable the system to convert handwritten or printed text and other symbols in the check image to machine encoded text such as text based files that can be edited and searched. The set of information in the check images is then extracted from the scanned image of the check which can then be used and incorporated into a variety of applications, documents, and processes. In some embodiments, the set of information includes but is not limited to, a payee, a payor, a date, a memo line data, a payment amount, a check number, and endorsement, a signature, and/or the like.

However, the accuracy of the process depends on the quality of the check image, the quality of the identified check data extracted from the check image, whether or not the check data can be verified, and/or the like. If the check image includes blurred text or has a low pixel count, the text produced by OCR may not be accurate. In some embodiments, the source of the check image may be responsible for the quality of the check image itself. In this regard, the transaction terminals capable of accepting the checks and processing the checks to retrieve the check image may be malfunctioning, causing a particular group/batch of checks to be misrepresenting the check information. In some cases, the quality of the physical check may be questionable prior to being deposited at a facility or a transaction terminal. This may cause the check image to be representative of the quality of the physical check, thereby creating questionable check data. In one exemplary situation, the system may determine that handwritten portions of a check image should not undergo OCR processing due to the difficulty in identifying such handwritten portions. Exemplary unrecognized data includes handwritten text, blurred text, faded text, misspelled data, any data not recognized by the OCR processes or other data recognition techniques, and the like.

Typically, the checks are processed based on a confidence level associated with the check data. This includes transmitting the check data to a clearinghouse that sorts checks to send them to financial institutions against which the checks are drawn. Once the check data is verified and the funds transfer confirmed, the checks are cleared. The financial institution may then hold the original check anywhere from a few weeks to a few months based on one or more disposition parameters before disposing the check. However, in some instances a check may be inappropriately processed as every confidence level is associated with an error margin. Some of these cases may not develop until after the physical check is disposed. In such a situation, the financial institution may only be left with the check image used in the processing of the check and not the physical check itself. To avoid such a situation, financial institutions store every check that is processed. In doing so, the financial institutions are currently faced with the problem of a space crunch due to the increased volume of checks aggregated over the years. The present invention provides the functional benefit of determining an automated means for disposition of checks based on processing a set of information associated with a check image using one or more disposition parameters.

Figure 2:
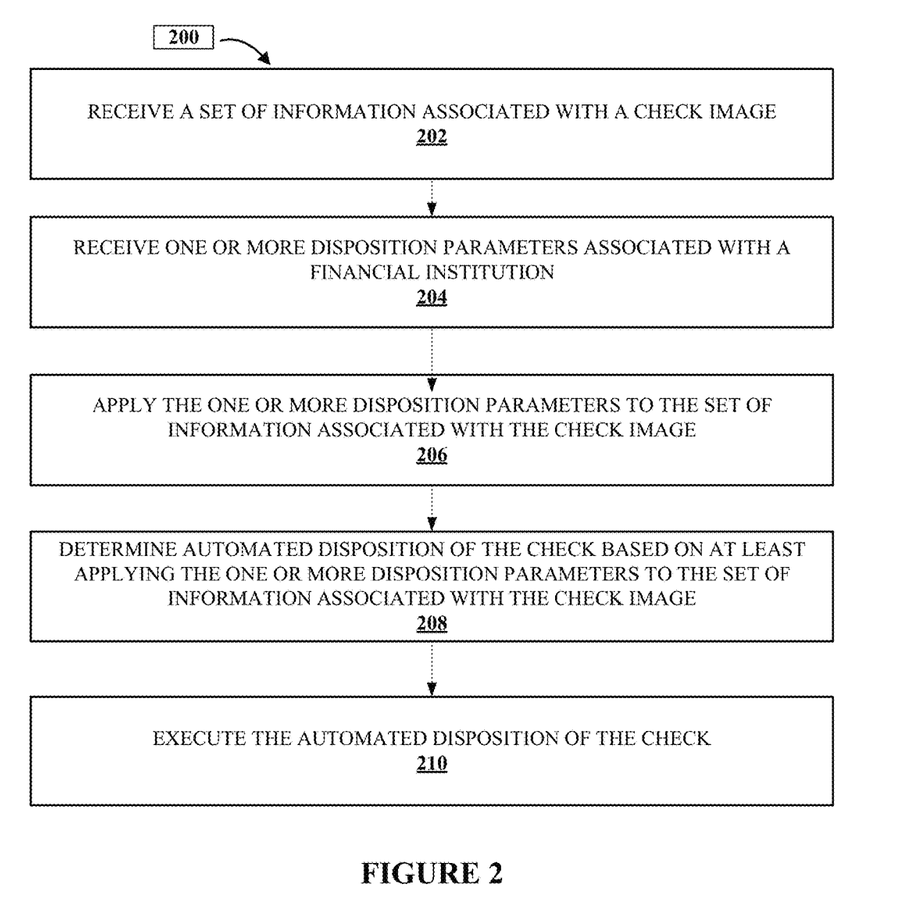
FIG. 2 provides a process flow for processing a set of information associated with a check image using one or more disposition parameters to determine an automated disposition of the check associated with the check image, in accordance with embodiments of the invention.

FIG. 2 illustrates a process flow for processing a set of information associated with a check image using one or more disposition parameters to determine an automated disposition of the check associated with the check image 200, in accordance with an embodiment of the invention. As shown in block 202, the process flow includes receiving a set of information associated with the check image. In some embodiments, the set of information associated with the check image includes information extracted from a scanned image of the check. In this regard, as explained above, the information extracted from the scanned image of the check may include but is not limited to, a payee, a payor, a date, a memo line data, a payment amount, a check number, and endorsement, a signature, and/or the like. Typically, the information extracted from the scanned image of the check may be used in processing the check, i.e., multiple funds have been transferred from a payor's account and debited into a payee's account. In some other embodiments, the set of information associated with the check image includes metadata associated with the check. In this regard, the metadata associated with the check includes but is not limited to, a check source indicating where the check was initially deposited for processing, information associated with a scanner at the check source, quality of the scanned check image, a check version, general information associated with the check, and/or the like. In some embodiments, a check source may include but is not limited to, an automated transaction machine (ATM), a financial institution facility, a point of sale terminal associated with the merchant, a transaction terminal associated with a third-party, and/or the like. In one aspect, information associated with the check source may also include any information associated with any intermediary entity involved in the processing of the check from a time the check was deposited a check source until the time the check is processed and funds transferred. In some embodiments, information associated with the scanner at the check source may include but is not limited to, a type of scanner such as a high-speed check scanner or single fee check scanner, a type of handwriting recognition software (e.g. magnetic ink character recognition) used to scan the check, a make and model of the check scanner, and/or the like. In further embodiments, the quality of the scanned check image includes determining the resolution at which the check was scanned (e.g., 100 ppi, 200 ppi, 300 ppi, or the like), an image format associated with the check image (e.g., JPEG, TIFF, or the like), an image type (e.g., black and white, grayscale, or the like), a communication standard used in the electronic exchange of check images (e.g., X9.37), and/or the like. In some embodiments, determining a check version includes determining when the check was initially issued by the financial institution. Based on the version of the check, the set of information retrieved from the check may vary as some financial institutions may update their checks based on aspects including but not limited to, position and sequence of text fields, quality of ink, information associated with financial institution facility, and/or the like. In some embodiments, general information associated with the check may include but is not limited to a quality of the check paper when issued to the customer, quality of the check paper when deposited by the customer, dimensions of the check, check transmission route, and/or the like.

In some embodiments, the set of information further includes whether the check image was associated with an error. In this regard, the system may be configured to determine whether the check image used to process the check had image quality issues is required personnel intervention for clarification and additional processing. This includes accounting for overall clearing expenses, research and repair process, transportation costs, write-offs, and in some cases, paper settlement process.

Next, as shown in block 204, the process flow includes receiving one or more disposition parameters associated with a financial institution. Typically, the disposition parameters may be one or more internal, external, and/or regulatory parameters used to analyze the set of information associated with the check image. The disposition parameters may reflect one or more conditions and/or standards that the check is expected to adhere to from a time the check is deposited by the customer until a time the check is processed and funds transferred.

In response to receiving one or more disposition parameters, the process flow includes applying the one or more disposition parameters to the set of information associated with the check file, as shown in block 206. In this regard, the system may be configured to identify one or more issues associated with the check based on at least applying the one or more disposition parameters and determining automated disposition of the check based on at least the one or more identified issues. Typically, the one or more issues may be determined based on at least determining whether the set of information associated with the check meets the one or more disposition parameters. If the set of information associated with the check meets the one or more disposition parameters, then the check is said to have seamlessly processed. If the set of information associated with the check does not meet even one of the one or more disposition parameters, then the check set to have not seamlessly processed.

Next, as shown in block 208, the process flow includes determining automated disposition of the check based on at least applying the one or more disposition parameters to the set of information associated with the check image. In some embodiments, the system may be configured to determine that the automated disposition of the check includes determining that the check has been process successfully and that the check can be disposed of permanently. In this regard, the system may determine that the check has been processed seamlessly and does not indicate any issues. In another embodiment, the system may be configured to determine that the automated disposition of the check includes placing the check on hold in the check repository for a predetermined period of time based on at least the one or more issues identified. In this regard, the system may determine that the processing of the check required an additional manual processing and that the check was not processed seamlessly. For example, if a checking account associated with the payer was identified to have insufficient funds or a stop-payment order has been placed, the process is flagged and the information is transmitted back to the financial institution where the check was deposited. In this situation, the financial institution may require an employee to further verify this information during the processing of the check. In yet another embodiment, the system may be configured to determine that the one or more issues include an indication that the check is to be returned to a financial institution customer. In response, the automated disposition of the check may include placing the check on hold to be returned to the customer.

Next, as shown in block 210, the process flow includes executing the automated disposition of the check. In this regard, the system may be configured to transmit control signals configured to cause a proprietary mechanical apparatus associated with the financial institution to physically place the check in a check repository associated with the financial institution. In some embodiments, the system may be configured to transmit control signals to cause the mechanical apparatus associated with the financial institution to place the check into one or more categories within the check repository. In one aspect, the one or more categories may be based on one or more post-processing actions to be executed on the check.

In some embodiments, the system may be configured to receive a set of information associated with the one or more check images, wherein the set of information associated with the one or more check images includes information extracted from a scanned image of one or more checks and metadata associated with the one or more checks. In this case, the system may then initiate a batch processing for the one or more checks, wherein initiating further comprises aggregating the set of information associated with the one or more check images into one or more batches. In this case, if an issue is identified, the system may be configured to determine whether the issue is associated with a specific check or whether the issue is associated with the batch of checks. In this regard, the system may be configured to identify one or more issues associated with a batch of checks based on at least aggregating the set of information associated with the one or more checks. In response, the system may then determine an automated disposition of the batch of checks based on at least the one or more identified issues associated with the one or more checks in the batch.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for processing a set of information associated with a check image using one or more disposition parameters to determine an automated disposition of a check associated with the check image, the system comprising:
   at least one memory;
   at least one processor; and
   at least one module stored in the at least one memory and comprising instruction code that is executable by the at least one processor and configured to cause the at least one processor to:
   scan check images of a batch of physical checks;
   initiate batch processing of the batch of physical checks;
   determine a quality of the check images;
   perform optical character recognition to extract text from the check images;
   determine a quality of the extracted text;
   identify an issue associated with the check images based on the quality of the check images or the quality of the extracted text;
   determine whether the issue is associated with a specific check or whether the issue is associated with the batch of physical checks;
   in response to determining that the issue is associated with the batch of physical checks, determine automated disposition of the batch of physical checks based on the quality of the check images and the quality of the extracted text; and
   execute the automated disposition of the batch of physical checks, wherein executing the automated disposition further comprises sending control signals to a mechanical apparatus, the control signals being configured to cause the mechanical apparatus to physically place the batch of physical checks in a check repository associated with a financial institution.

2. The system of claim 1, wherein:
   executing the automated disposition of the batch of physical checks further comprises placing the batch of physical checks on hold in the check repository for a predetermined period of time based on at least the issue identified.

3. The system of claim 1, wherein:
   executing the automated disposition of the batch of physical checks further comprises placing the batch of physical checks on hold to be returned to a customer based on at least the issue identified.

4. The system of claim 1, wherein the module comprises instruction code that is configured to cause the at least one processor to:
   receive a set of information associated with the check images of the batch of physical checks, wherein the set of information associated with the check images comprises metadata associated with the batch of physical checks.

5. The system of claim 1, wherein:
   executing the automated disposition of the batch of physical checks further comprises designating the batch of physical checks for manual check processing.

6. A computerized method for processing a set of information associated with a check image using one or more disposition parameters to determine an automated disposition of a check associated with the check image, the method comprising:
   scanning check images of a batch of physical checks;
   initiating batch processing of the batch of physical checks;
   determining a quality of the check image;
   performing optical character recognition to extract text from the check image;
   determining a quality of the extracted text;
   identifying an issue associated with the check images based on the quality of the check images or the quality of the extracted text;

determining whether the issue is associated with a specific check or whether the issue is associated with the batch of physical checks;

in response to determining that the issue is associated with the batch of physical checks, determining automated disposition of the batch of physical checks based on the quality of the check image and the quality of the extracted text; and executing the automated disposition of the batch of physical checks, wherein executing the automated disposition further comprises sending control signals to a mechanical apparatus, the control signals being configured to cause the mechanical apparatus to physically place the batch of physical checks in a check repository associated with a financial institution.

7. The method of claim 6, wherein executing the automated disposition of the batch of physical checks further comprises placing the batch of physical checks on hold in the check repository for a predetermined period of time based on at least the issue identified.

8. The method of claim 6, wherein:
executing the automated disposition of the batch of physical checks further comprises placing the batch of physical checks on hold to be returned to a customer based on at least the one or more issue identified.

9. The method of claim 6, wherein the method further comprises:
receiving a set of information associated with the check images of the batch of physical checks, wherein the set of information associated with the check images comprises metadata associated with the batch of physical checks.

10. The method of claim 6, wherein:
executing the automated disposition of the batch of physical checks further comprises designating the batch of physical checks for manual check processing.

11. A computer program product for processing a set of information associated with a check image using one or more disposition parameters to determine an automated disposition of a check associated with the check image, the computer program product comprising a computer readable storage medium having computer readable program code embodied therewith, the computer readable program code comprising:

computer readable code configured to scan check images of a batch of physical checks;

computer readable code configured to initiate batch processing of the batch of physical checks;

computer readable code configured to determine a quality of the check image;

computer readable code configured to perform optical character recognition to extract text from the check image;

computer readable code configured to determine a quality of the extracted text;

computer readable code configured to identify an issue associated with the check images based on the quality of the check images or the quality of the extracted text;

computer readable code configured to determine whether the issue is associated with a specific check or whether the issue is associated with the batch of physical checks;

computer readable code configured to, in response to determining that the issue is associated with the batch of physical checks, determine automated disposition of the batch of physical checks based on the quality of the check image and the quality of the extracted text; and computer readable code configured to execute the automated disposition of the batch of physical checks, wherein executing the automated disposition further comprises sending control signals to a mechanical apparatus, the control signals being configured to cause the mechanical apparatus to physically place the batch of physical checks in a check repository associated with a financial institution.

12. The computer program product of claim 11, wherein:
executing the automated disposition of the batch of physical checks further comprises placing the batch of physical checks on hold in the check repository for a predetermined period of time based on at least the issue identified.

13. The computer program product of claim 11, wherein:
executing the automated disposition of the batch of physical checks further comprises placing the batch of physical checks on hold to be returned to a customer based on at least the issue identified.

14. The computer program product of claim 11, wherein the computer readable program code comprises computer readable code configured to receive a set of information associated with the check images of the batch of physical checks, wherein the set of information associated with the check images comprises metadata associated with the batch of physical checks.

15. The computer program product of claim 11, wherein executing the automated disposition of the batch of physical checks further comprises designating the batch of physical checks for manual check processing.

* * * * *